United States Patent [19]
Strauff

[11] 3,967,537
[45] July 6, 1976

[54] PRESSURE MEDIUM CONTROL DEVICE

[75] Inventor: Günther Strauff, Kaarst, Germany

[73] Assignee: Langen & Co., Duesseldorf, Germany

[22] Filed: Aug. 24, 1973

[21] Appl. No.: 391,271

[30] Foreign Application Priority Data
Aug. 26, 1972 Germany............................ 2242021

[52] U.S. Cl.............................. 91/372; 91/375 A; 251/77
[51] Int. Cl.² ........................................... F15B 9/10
[58] Field of Search ............ 91/370, 371, 372, 373, 91/375 A, 375 R; 251/77

[56] References Cited
UNITED STATES PATENTS

| | | | |
|---|---|---|---|
| 2,025,294 | 12/1935 | McAllister | 251/77 |
| 2,521,891 | 9/1950 | Beams | 251/77 |
| 2,600,650 | 6/1952 | Hieger | 251/77 |
| 3,298,316 | 1/1967 | Budzich | 91/371 |

FOREIGN PATENTS OR APPLICATIONS

| | | | |
|---|---|---|---|
| 975,518 | 11/1964 | United Kingdom | 91/375 A |

*Primary Examiner*—Paul E. Maslousky
*Attorney, Agent, or Firm*—Holman & Stern

[57] ABSTRACT

A fluid pressure control device for controlling a servo motor is disclosed, the control device being provided with at least one pressure control valve for controlling pressure in a working chamber of the servo motor and transmitting a thrust corresponding to the pressure in the working chamber back to a power input member; operation of the pressure control valve being derived from the power input member through a lost motion coupling means.

10 Claims, 11 Drawing Figures

PRESSURE MEDIUM CONTROL DEVICE

BACKGROUND OF THE INVENTION

The present invention concerns a fluid pressure control device for controlling at least one working chamber of a servo motor, the device having one or more control valves which are operated via operating means through relative movements between a power input member and a power output member. The power output member is connected with the power input member by means of flexible coupling elements, whereby the servo motor is in operative connection with the power output member. The control valves are provided with reaction areas for signalling developing pressures at the power input member, and/or in operative connection with one or more corresponding reaction members.

Pressure control devices are required in all cases where it is necessary to increase power or torsional moments. Common fields of application are servo-steering systems of motor vehicles or reinforcement for rudder mechanisms on ships. Since some of the problems which occur during practical application are more easily explained by referring to a servo-steering, such a device will be referred to in the following description, without, however, any intention to limit the invention to use with servo-steering devices.

In a servo-steering device, the power input member is connected with a steering wheel, while the power output member is operatively connected to steerable wheels, whereby the servo motor assists the movements of the steering wheel in the sense of an amplifier. Numerous publications have already dealt with servo steering devices, with particular regard to the arrangement of the control valves, as well as for producing relative movement, many proposals have been made, while other proposals are concerned with the arrangement and construction of reaction members.

In this regard, the arrangement and construction of coupling members have been the subjects of publications such as, for example, German Pat. Nos. 936,973; 1,003,610; 1,113,642; and 1,137,963, as well as the German Disclosure published for Inspection, No. 1,924,032. The coupling members may be provided with an initial resistance so that relative movements result only after the initial resistance has been overcome. It is, however, also possible to construct a coupling without initial stress. Depending on the construction, it is, therefore, possible at first to steer without amplification or power assistance or only with low amplification. Little or no amplification is desired, for example, in fast motor vehicle travel and/or during icy road conditions. However, since during purely mechanical power-transmission, the servo motor also performs a movement and therefore must either distribute or absorb pressure medium, the pressure medium control devices of the above-described prior art type have so far always been provided with control-valves of an "open-center contruction", i.e., in a neutral position of the control valves, each working area of the servo motor is connected with at least one outlet so that a free movement is present. Thus, it is also possible to connect all ports with each other so that there results a more or less positively throttled circulation of the pressure medium.

SUMMARY OF THE INVENTION

A desirable utilization of the described principles of partial mechanical power transmission to devices of the "closed-center type of construction" has been impossible in the prior art, since in such types of construction all connections are blocked in a neutral position, accordingly, a blockage of the servo motor resulted, so that such an arrangement would not function.

It is at this point that the present invention proves to be effective. It is within the scope of the present invention to construct a fluid pressure control device of the above-described general type in such a way that mechanical power transmission is possible in control valves of a "closed-center construction". The hydraulic amplification should be able to start thereby immediately, or after overcoming an initial stress or resistance.

The problem in this connection is solved so that power transmission from the power input member to the control valves, which is required to operate the control valves, is made via a lost motion coupling. In such an arrangement, the power input member, starting from a neutral position, is not immediately coupled to the control valves, i.e., initial relative movement between the power input member and the power output member have no immediate effect at first on the control valves during initial movement of the power inlet member. Since, on the other hand, the control valves are provided with reaction areas and/or are coupled with corresponding reaction members, the pressure variations which result during the displacement of the servo motor affect the control valves in such a way that a displacement from the neutral position takes place. These displacements in any case guarantee that fluid can flow either from or to the servo motor.

Depending on the outer forces which have to be overcome at the power output element, a relative movement between the power input member and the power output member will result after overcoming the initial resistance of the flexible coupling element, so that the extent of lost motion is reduced until finally a mechanical coupling between the power input member and the control valves results. From this point on, the system functions like a common servo steering system with an overlapping, constant mechanical participation of power transmission. A change of this characteristic is obtained in that the lost motion coupling is parallel-switched to a flexible coupling. This flexible coupling will have the effect, in combination with the reaction areas or the reaction members, so that a considerable portion of the power extended in the hydraulic force of reaction, in addition to the purely mechanical power, is transmitted. A further change in these characteristics can be obtained through a suitable adaptation of the initial stresses of the above-mentioned flexible couplings.

An additional possibility exists in the utilization of coupling elements with non-linear characteristics in addition to coupling elements with linear characteristics. It is advantageous to select the initial stress of those flexible couplings which are arranged relative to the lost motion coupling element, such that said stress is overcome earlier than the initial stress of the flexible coupling between the power inlet member and the power outlet member. In fluid pressure control devices which are provided with two control pistons, or one control piston having a reaction area and one reaction piston mounted in a valve member across and off-center to its axis, which pistons cooperate either directly or by means of push rods, cams, etc. with a rotatable lever oppositely placed to the valve element in the form of a torque dynamometer, it has been found very effective to position the lever in the valve element, and to mount a second lever which rotates the first lever after overcoming lost motion.

In order to reduce friction, the lever which serves as the torque-dynamometer may be positioned on an edge which is attached to the valve element. Preferably, this lever, with regard to the axis of the valve element, is more eccentrically arranged than the lever which serves for activation, and is provided with recesses or openings in the direction of the axis of the pistons, whereby the pistons or the push rods which affect the pistons, etc., penetrate these recesses or openings with a certain amount of play, in order to produce an operative connection between the pistons and the first lever. Springs, which serve as flexible couplings, may be arranged between the levers. The springs may, for example, comprise helical springs which are guided in the levers in opposite concentrically arranged countersunk positions. It is, however, also possible to construct the lever serving the activation as a plate-spring so that this lever, after making contact with the other lever, in itself functions as a flexible coupling.

BRIEF DESCRIPTION OF THE DRAWINGS

The present invention is explained in more detail by the following description of the preferred embodiments, in conjunction with the accompanying drawings, wherein.

DESCRIPTION OF THE PREFERRED EMBODIMENTS

Referring to the drawings, there is shown a power input member 1 which acts upon a power output member 3 by means of a flexible coupling 2. Even though the flexible coupling 2 is shown as being assisted by helical springs 4 and 5, it should be understood by a person skilled in the art that this illustration represents only one possible construction. Naturally, the illustrated helical springs 4 and 5 may be replaced by any other type of spring means. For the purpose of simplicity, however, only helical springs are illustrated initially.

Accordingly, the power input member 1 reacts on the power output member 3 through of helical springs 4 and 5. Further A piston rod 6 is attached to the power output member 3 and is connected with a piston 7 which moves within a cylinder 8 of a servo motor 9. The piston 7 divides the cylinder 8 into working chambers 10 and 11. The working chamber 10 is provided with a port $A_1$ which is connected with the port A of a control valve 13 through conduit 12. The working chamber 11 of the servo motor 9 is connected with port B of the control valve 13 by port $B_1$ and a conduit 14.

The control valve 13 is provided with two additional ports P and T. Port P is connected with a fluid pressure source 15 (not shown in detail). An outlet conduit is connected with the port T. The control valve has a casing 16 (not shown in detail) which is fixedly connected to the power output member 3. In a bore 17 of the casing 16 is a reciprocatable control piston 18 which is integrally connected to the power input member 1 by means of operating rod 19. The control piston 18 blocks, in a centered position the port P or connects the ports A and B each with the port T. In a one switch position, the connection from port P to the port B is opened, while the connection between the ports A and T are further opened. Finally, in another switch position, the port P is connected in a reverse manner with port A, while the connection between the ports B and T is further opened. The control piston 18 is provided with opposed reaction areas as indicated at "a". Reaction chambers are formed in bore 17 adjacent the reaction areas "a" and are indicated at 20 and 21, the reaction chamber 20 is connected to conduit 12 through a control line 22 and reaction chamber 21 is connected to conduit 14 through control line 23.

OPERATION OF FIG. 1

Figure 1:
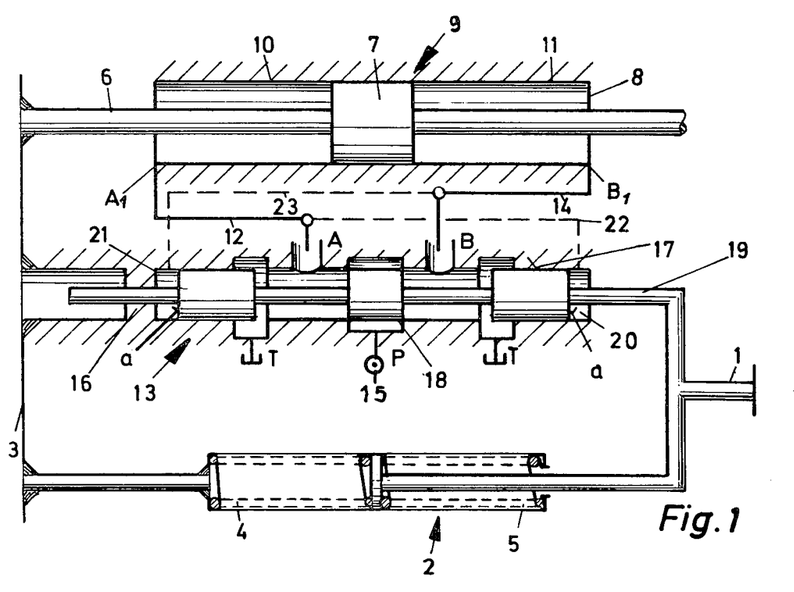
FIG. 1 shows a schematic arrangement of a fluid pressure control system in combination with a servomotor and the flexible coupling, with the control valve shown being of an "open-center construction"

The system described herewith is in practice realized by servo steering systems having a torsion rod and control valves with "open-center construction". It is to be noted that the power inlet member 1 is rigidly connected with the operating rod 19. Accordingly, displacement of the power input member 1 results in immediate displacement of the control piston 18 and a displacement of the power output member 3 as well as the piston 7 which is connected thereto. Simultaneously, however, the casing 16 of the control valve 13, connected to member 3, is also displaced to the same extent as piston 7. Since the connections A-T and B-T are initially open, fluid pressure will flow, for example, from working chamber 10 via connection A-T, while pressure can be drawn into the working chamber 11 via connection B₁-T. Relative movement between casing 16 and control piston 18 occurs only after the initial resistance of lost motion coupling member 2 is overcome. Starting with this movement, the control piston 18 is displaced relative to the casing 16, whereby the fluid connection, through which fluid flows from the working chamber, is being opened further, so that full movement of piston 7 is retained.

Figure 2:
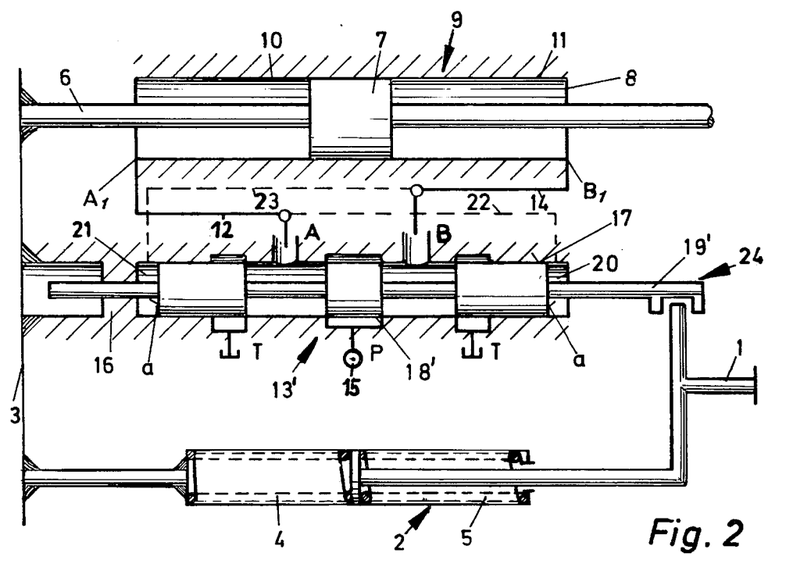
FIG. 2 shows an arrangement similar to that of FIG. 1, in which, a control valve of the "closed-center construction" is disclosed.

One of the important differences of the system according to FIG. 2, in contrast to the system shown in FIG. 1, resides in that, in place of the control piston 18, which has an "open-center construction", in the system shown in FIG. 2 there is provided a control piston 18' which has a "closed-center construction". The "closed-center" system is one, when in a neutral position, ports A, B, P and T are separated from one another. A further difference resides in that an operating rod 19' which is connected to the control piston 1, is not integrally coupled to the power inlet member 11 but can be connected with member 1 only by means of a lost motion coupling 24. The system of the lost motion coupling 24 is more easily understood if one considers at first a fixed connection as well as an initially stressed coupling member 2. Until the initial stress is overcome, such a system also represents a fixed connection between the control piston 18' and the casing 16. Since, on the basis of this fixed connection, the control piston 18' opposite the casing 16 cannot perform a relative movement, the ports A, B, T and P remain blocked. The pressure which is locked in the working chamber 10 and 11 can thus not escape so that the piston 7 of the servo-motor 9 is initially blocked.

If one now again utilizes the above mentioned lost motion coupling 24 in place of the fixed connection between the power inlet member 1 and the operating rod 19', one then notes that the operating rod 19' initially remains uninfluenced by the initial movements of the power inlet member 1. This permits the pressure variations which result in the generating spaces 10 and 11 to propagate to the reaction areas "a" of the control piston 18' by means of a movement of piston 7, and to thereby displace the control piston 18' from its center position. The displacement is thereby made automatically always in the correct direction.

If, for example, in FIG. 2, the power input member 1 is moved to the left, then the power output member 3 as well as the piston 7 also move to the left. In working chamber 10 there developes a pressure increase which is transmitted via conduit 12 and the control conduit 22 to reaction chamber 20; the control piston 18' is also moved to the left so that connections A-T, and P-B are opened. Pressure can thus flow from the working chamber 10 via the conduit 12 and connection A-T, while pressure is fed into the working chamber 11 via the connection P-B and conduit 14 and the piston 7 has free movability. Only if at any time period the initial stress of the flexible coupling 2 is overcome, then the movement of the power inlet member 1 takes place close to movement of the operating rod 19'. This proximity to the rod 19' continues until contact is made between the power input member 1 and the rod 19'. From this time on, the initial stress of the coupling 2 remains constant, and the control piston 18' follows the movement of the power inlet member 1. The pressures which develop in the reaction chambers 20, 21 have a return-effect on the power inlet member 1 as a hydraulic reaction.

Figure 3:
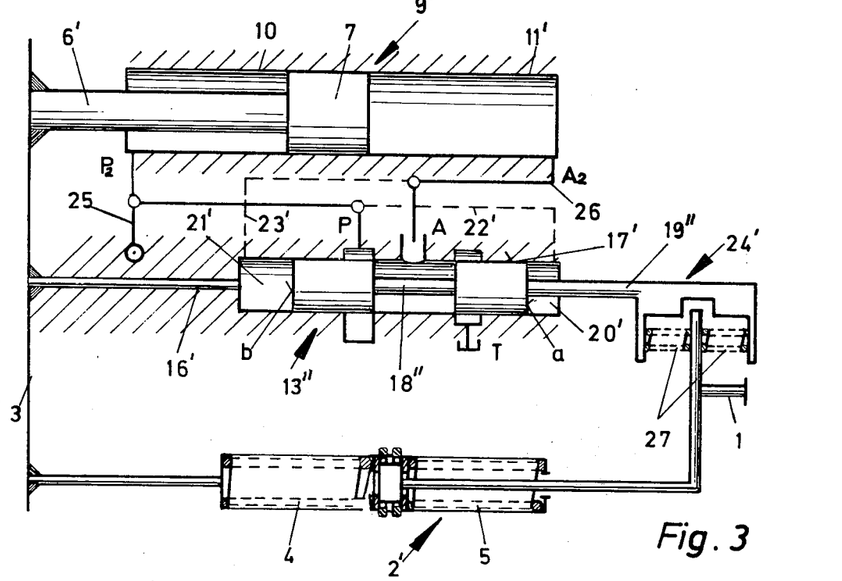
FIG. 3 illustrates a further embodiment of the arrangement shown in FIG. 2, in which a flexible coupling is parallel-switched to the lost motion coupling, and whereby, additionally, the flexible coupling, which functions between the input member and the output member, is provided with an initial resistance.

FIG. 3 shows a servo motor 9' having a unilateral piston rod 6' instead of the servo motor 9 with the bilateral piston rod 6 as in FIGS. 1 and 2. Thus, a working chamber 11' is adjacent the free front area of piston 7, and the functional area of working chamber 11' is twice as large as the effective area of the working chamber 10. The servo motor 9' is controlled by means of so-called socalled "dual-edge-control". The characteristic of this type of control system results in the working chamber 10, having the smaller effective area, being always connected with a pressure-source via a conduit 25 through a port P₂. The working chamber 1' is connected with a port A of a control valve 13" by means of a port A₂ and a conduit 26. The control valve 13" has a casing 16' with a bore 17' into which reciprocates a piston 18". The control piston 18" is capable of interchangeably connecting the port A with two additional ports P and T of the control valve 13", or of blocking the port A from ports P and T.

The control piston 18" is integrally connected to an operating rod 19" and at the side to which it is connected, the control piston 18" is provided with a reaction area "a" communicating with a reaction chamber 20'. The opposite front area of the control piston 18" functions as the reaction area "b" and is twice the size of the reaction area "a", the adjacent reaction chamber is indicated at 21'. The reaction chamber 20' is connected to conduit 25 via a control conduit 22'. A control conduit 23' branches off from the conduit 26 and leads to the reaction chamber 21'. The operating rod 19" is provided with a lost motion coupling 24'. Parallel to the lost motion coupling 24' there is also located a flexible coupling 27 between power input member 1 and operating rod 19".

With regard to this system of FIG. 3, it should be noted at first that the actual difference is not in the utilization of a control valve with "dual-edge control". It is important, however, to note that in contrast to the arrangement of FIG. 2, coupling 24, which is parallel switched to the lost motion coupling 24" of FIG. 3. For an explanation of this difference, see FIG. 4, in the graphic illustration therein, the ordinate is arranged to the input power $F_E$. On the abscissa, however, the output power $F_A$ is removed. All of the illustrated curves begin in the zero point. The curve 0–30 shows the relationship in a purely mechanical power transmission from the power input member 3. Line 0–31 represents the functional process during a power transmission without mechanical power transmission participation, whereby, however, a hydraulic reaction is reflected.

In the system of FIG. 2, one obtains, up to the point of surpassing the lost motion, a purely mechanical power transmission via coupling 2; the respective force is indicated 0–28; after overcoming the lost motion, there begins at once the servo-support or assistance with the hydraulic reaction which results parallel to line 0–31. In the arrangement according to FIG. 3, there is provided an initially-stressed coupling 2'. Even though helical springs are also shown here, it will be clear to one skilled in the art that one could have also used other spring means or even pressure-centering piston-cylinder systems having very low elasticity constants. Similarly, there results, at first, a purely mechanical power transmission which is indicated by line 0–29; after overcoming the initial stress, by means of an additional initial-stress, the coupling 27 is stressed. According to the initial stressing of the coupling 27 a hydraulic reaction force builds up on the control piston 18", the incline of the respective force is between the inclines of curve 0–30 and the curve 0–31 and is indicated with 29–33.

Figure 4:
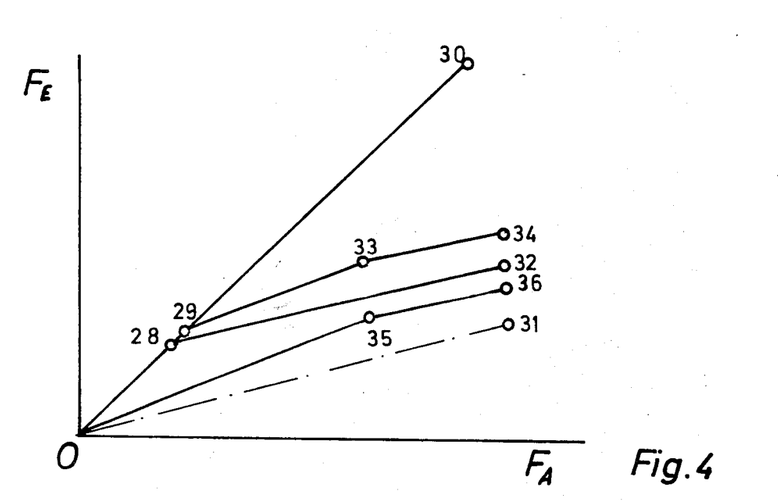
FIG. 4 shows a diagrammatic illustration, by means of various curves, of the relationship of the input power on the output power in accordance with the various arrangements.

The full hydraulic increase also begins only when the lost motion moment is overcome. There also results, in this case, a curvature 33–34 which runs parallel to the curvature 0–31.

For the purpose of completeness, reference is made also to the curvature 0–35–36. Such a system would result if non-initially stressed coupling 2 were combined with a flexible coupling 27. In such a case, a purely mechanical power transmission would not be needed since immediately, according to the initial stress of the coupling 27, a hydraulic reaction would build up. This means, however, nothing more than that from the start, a mechanical as well as a hydraulical power transmission takes place. Only when reaching point 35, which is equivalent to overcoming the lost motion point, does there then begins the full hydraulic reinforcement so that the curvature 35–36 runs parallel to the curve 0–31. Characteristic curves which comprise a plurality of gradually levelling curvature sections are received, for example, in the case where the flexible coupling 27 comprises a plurality of gradually operating springs. A similar characteristic would be obtained if the characteristic of the coupling 27 is progressive.

In general, it should again be pointed out that the arrangement of the reaction areas which are required for producing the hydraulic reaction, while shown as a part of the control piston, need not be constructed in such an arrangement. It is possible to provide the control piston with only one reaction area, and to arrange the other reaction area to a separately arranged reaction member. Finally, it is also possible to retain the control piston free of reaction areas, and to place both reaction areas on separately mounted reaction members.

Figure 5:
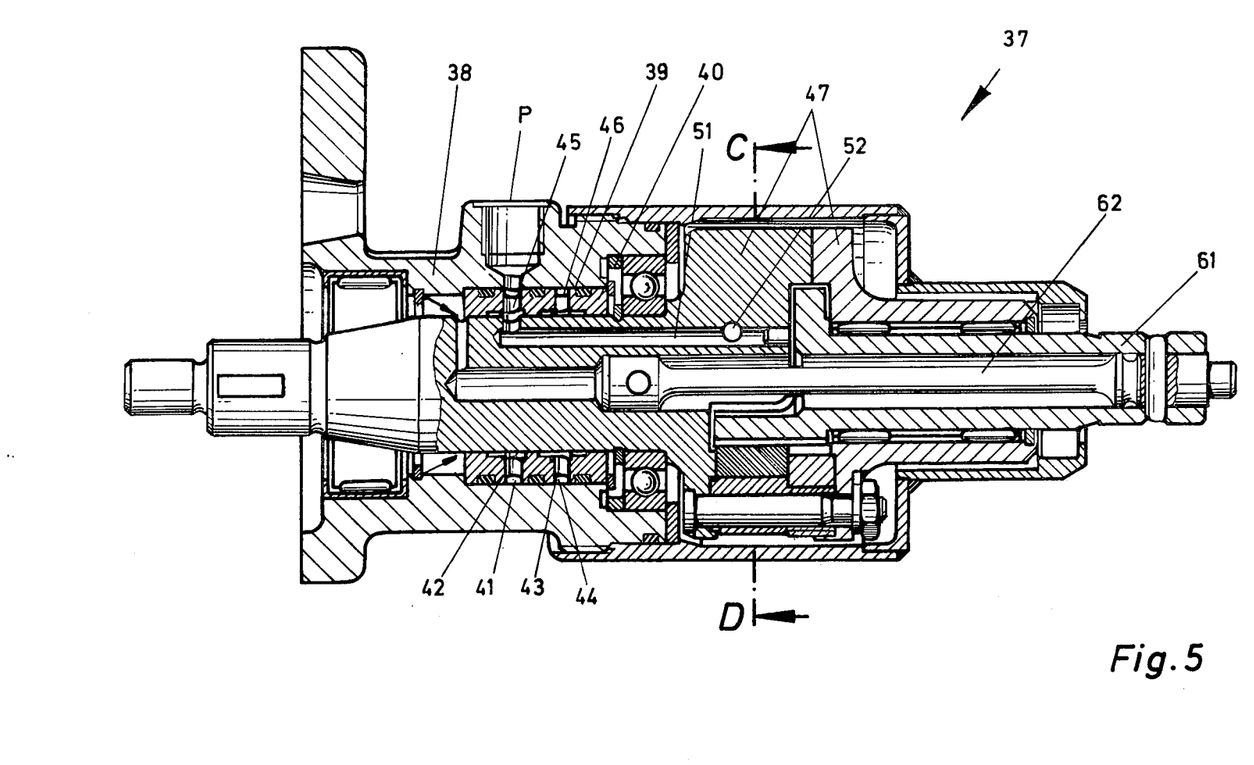
FIG. 5 is a longitudinal sectional elevational view of fluid pressure medium control device in which a torsion rod is utilized as a flexible coupling element between input member and output member.
Figure 6:
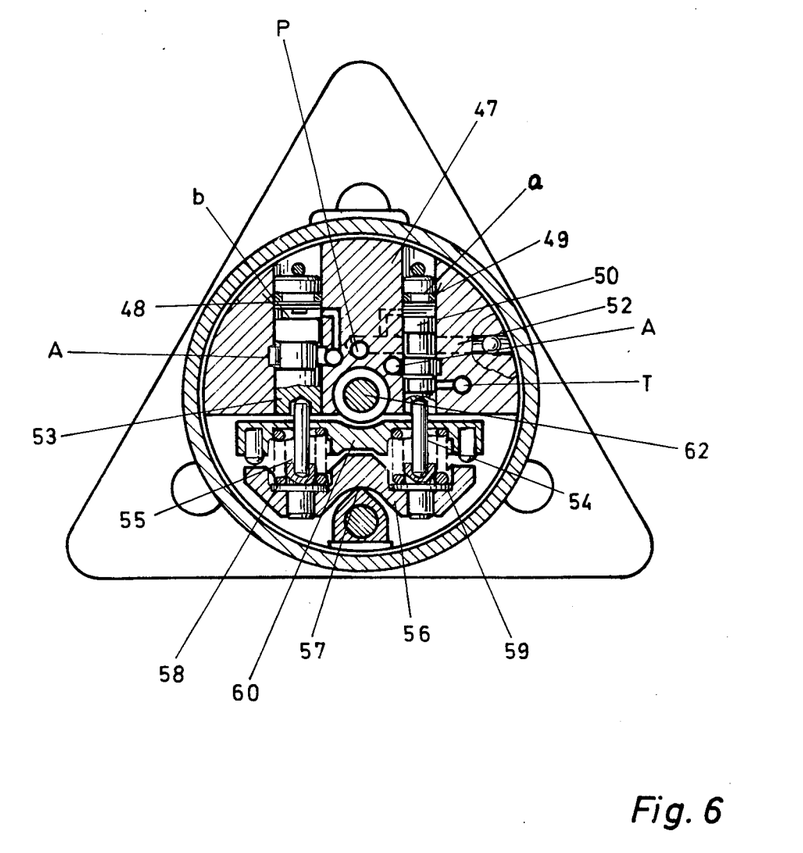
FIG. 6 is a transverse sectional view of the pistons of the pressure medium control device of FIG. 5 taken along line C-D.
Figure 7:
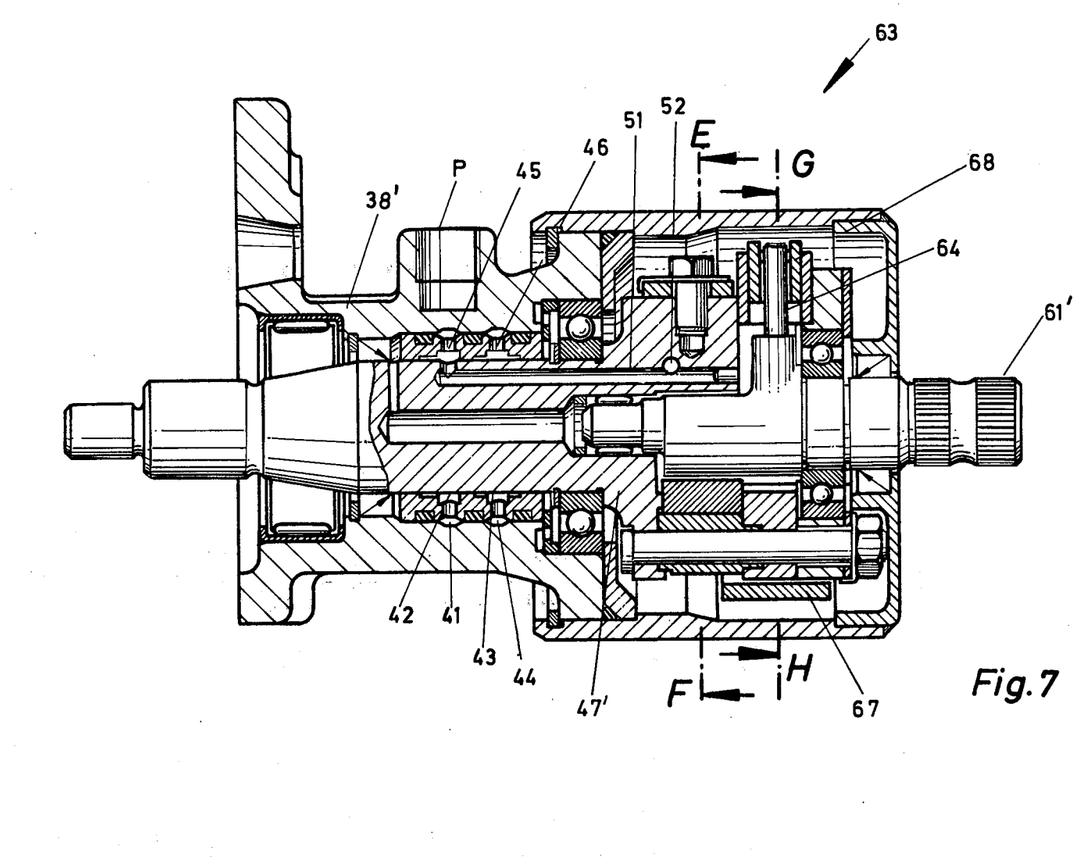
FIG. 7 is a longitudinal sectional elevational view of an alternative medium control device in which an elastic, slit ring is utilized as the flexible coupling element between the input and output member.
Figure 8:
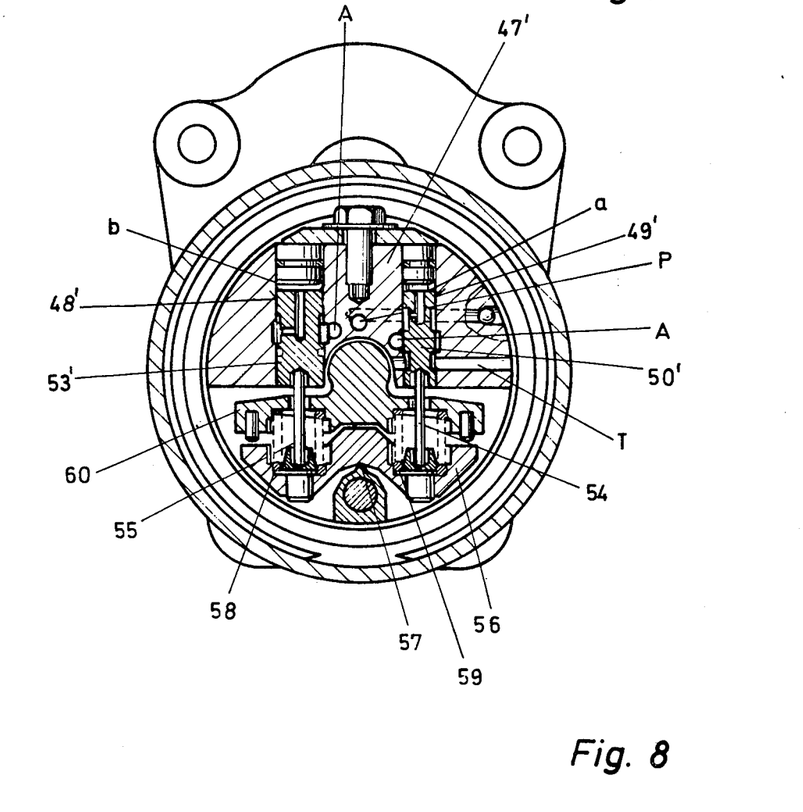
FIG. 8 is a transverse sectional view of the pistons of the pressure medium control device, of FIG. 7 taken along line E-F.
Figure 9:
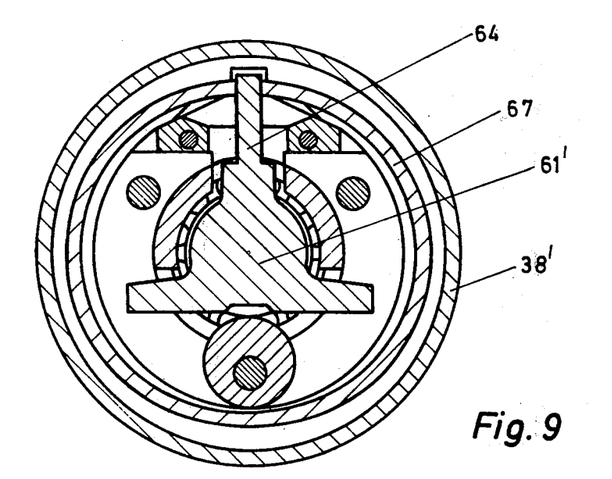
FIG. 9 is a transverse sectional view of FIG. 7 taken along line G-H.

FIGS. 5 and 6 illustrate one exemplary embodiment which corresponds with the curvature 0–35–36. A control valve 37 is provided with a connector element 38 which is secured against turning. The connector element 38 has a central borehole 39 into which is inserted a casing 40. The casing 40 is provided with annular tee-slots 41, 42, 43 and 44, which are positioned opposite to each other and connected to each other by means of transverse boreholes 45 and 46. A valve member 47 is guided in the casing 40 and serves as a power output element. The valve member 47 is provided with bores 48 and 49 which are positioned transverse and off-center to its axis. A control piston 50 is slidingly arranged in the bore 49. This control piston is in position to block the ports A, P and T from each other or to interchangeably connect the port A with the ports P or T. The ports A, P and T are located in the connector element 38. Visibly illustrated is the port P.

The ports A, P and T are connected with the control piston 50 by means of the above-mentioned annular tee slots 41, 42, 43 and 44, as well as the transverse boreholes 45 and 46 and longitudinal bore holes and transverse boreholes in the valve member 47. Of these various bore, a longitudinal borehole 51 and a transverse bore 52 are illustrated. For a better understanding, the reference symbols A, P and T are again shown for the respective longitudinal or transverse bores in the line C-D in FIG. 6. From this illustration, it may be also noted that the pressure of the port P is directed to the free front area "a" of the control piston 50 which serves as a reaction area.

In the bore 48 reciprocates a reaction piston 53, having a free front area "b" which serves as reaction area and which is constantly under pressure from the port A. Control piston 50 and reaction piston 53 are supported by means of push rods 54 and 55, respectively, on a lever 56, which is positioned on an edge 57 which is integral with the valve element 47. An additional lever 60 is connected to the lever 56 by means of springs 58 and 59, which springs serve as flexible coupling means. This lever 60 is in fixed connection with a shaft which serves as the power inlet member.

The axle 61 is positioned in the valve element 47 and is connected to an axial torsion rod 62 which serves as a flexible coupling. The switching arrangement thus corresponds with that shown in FIG. 3, although it must be considered that the torsion rod is not provided with an initial stress. Accordingly, one should not consider the coupling means 2' as being under an initial stress. The lost motion coupling 24' is realized in that the two levers 56 and 60 are rotatable relative to each other by a certain degree, before they come into mechanical contact with each other. Under the assumption that the shaft 61 is being rotated clock-wise, the lever arm 60 will also move clock-wise, but it will not touch lever arm 56 at first due to the play which exists between lever arms 56 and 60. Simultaneoutsly, the torsion rod 62 is stressed somewhat and the initial stress of the spring 59 is increased. This increase of the initial stress effects a force on the lever arm 56, so that also this lever is moved clock-wise and transmits this movement via the push rod 55 to the reaction piston 53. On the other hand, the control piston 50 and the push rod 54 follow the movement of the lever arm 56, namely, due to the pressure which exists on the reaction area a, so that the connection P-A is produced. The pressure on Connection A and therewith also the reaction-pressure on the reaction area b, will therefore increase, while the reaction pressure on the reaction area a in general remains the same. Therefore, there develops on the lever arm 56 a momentum which is in counter-direction of the direction of movement which momentum is felt by the driver of the vehicle as a feeling of actually driving, via the spring 59 or above a predetermined momentum by mechanical contact between levers 56 and 60, on the path via the shaft 61, additionally to the momentum of the torsion rod 62. The total operational momentum which the driver has to produce is composed of a mechanical participation, which is transmitted via the torsion rod 62 and a hydraulic participation, which is effected by the pressures on the reaction areas a and b.

A rotation of the shaft 61 counter-clockwise effects, in addition of a stressing of the torsion rod 62, an increase of the initial stress of the spring means 58. The lever 56 transmits the thusly effected force to the push rod 54 and from there to the control piston 50, which is pushed into a switch position which produces the connection A-T. With this connection A-T complies a decrease of the pressure on connection A and therewith simultaneously a decrease of the reaction pressure on the reaction area b, while the generally constant force on the reaction area a will be retained. With the pressure difference complies a reaction momentum which is counter to the operational momentum produced by the driver of the vehicle. This operational momentum again complies with the sum from this "hydraulic" reaction-momentum and a mechanical participation which is effected by the torsion rod 62.

FIGS. 7 to 10 show an arrangement which correspond with the arrangement shown in FIG. 3 and thereby also with the curvature 0–29–33–34. It is readily noted that various parts of the control valve 63 correspond with, or closely resemble, the respective parts of the control valve 37. Accordingly, the identical reference symbols are used for the identical parts, while for similar parts there were used the reference numerals with a primed symbol. The major difference compared with the control valve 37 resides in the construction of the flexible coupling between the shaft 61' which serves as the power input member, and the valve element 47' which serves as the power output member; these characteristics are shown in detail in FIGS. 8 and 10. An activating member 64 is fixedly connected with the shaft 61', and extends radially therefrom and is in contact with the ends 65 and 66 of a slotted, resilient ring 67; see FIGS. 9 and 10. The ends 65 and 66 are wider in axial direction compared with the axial width of the operating member 64. In addition to their bearing on the operating member 64, the ends 65 and 66 find an additional bearing on an adjacent piece 68 which is fixedly connected to the valve element 47'; bearing is continuous on the bottom of grooves 69 and 70 in the adjacent piece 68, extending in the axial direction, which are opposite each other in such a manner that there results a cross piece 71 between them. The cross piece 71, in tangential direction, has the same width as the operating member 64, which, in tangential direction, is movable towards both directions in an opening 72 which intersects the tee-slots 69 and 70 in a radial direction.

Figure 10:
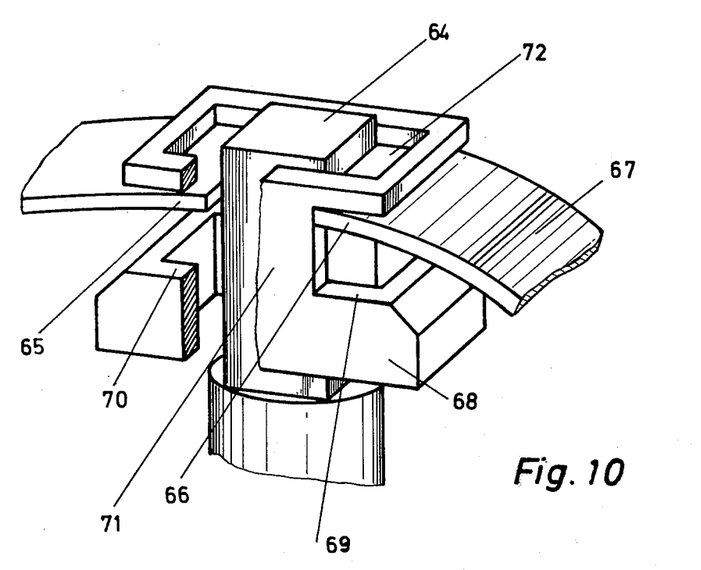
FIG. 10 shows, an enlarged schematic perspective illustration of a detail of the mounting of the slit ring which serves as a coupling means in FIG. 7.

In order to describe the function of these components, it may be assumed that the operating member 64, with regard to FIG. 10, is moved to the left; in a tangential direction in the opening 72 and lifts thereby the end 65 from its bearing point. The bearing point, which corresponds with the bottom part of the tee-slot 70, is not visible on account of the cross-sectional illustration. The lifting of the end 65 represents for the ring 67 a further increase of the stress. The ring 67 finds thereby its stop means by placing its end section 66 at the bottom of tee-slot 69. The initial stress of the ring 67 may be varied by the width of the cross piece 71. There exists a fixed connection between the axle 61' and the valve element 47' until the initial stress has been overcome. This fixed connection first represents a purely mechanical transmission of power and corresponds to the line 0–29 of FIG. 4. After the initial stress has been overcome, as described above, the operating member 64 moves relative to the adjacent piece 68 and therewith towards the valve element 47'; an identical movement is effected by the lever 60; see FIG. 8. The movements of lever 60, however, on account of the lost motion, are not immediately transmitted to the lever 56, but these movements result in an initial stress of springs 58 or 59. Depending on the initial stress of said springs 58 and 59, there results a hydraulic pressure on the reaction areas a and b of the control piston 50' or the reaction piston 53', respectively, see the characteristic force line, shown at 29–33. After further initial stress of the ring 67 and, simultaneously, a further initial stress of the springs 58 or 59, contact is finally made between the levers 56 and 60, and full hydraulic amplification is afforded see the characteristic line caused by the increase of the hydraulic reaction at 33–34 which extends parallel to line 0–31 which characterizes a purely hydraulic amplification.

Figure 11:
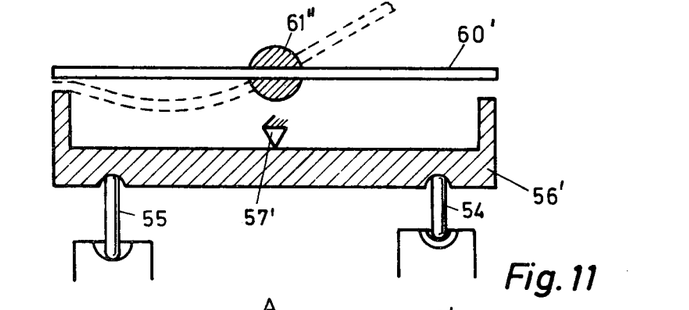
FIG. 11 shows a schematic view of the construction of a lever in the form of a plate spring serving as the actuation.

FIG. 11 diagrammatically shows two levers 56' and 60', with lever 56' being positioned on an edge 57' and engaging the pistons (not shown) by means of push rods 54 and 55. The lever 60' is fixedly connected to a shaft 61'' and, in contrast with lever 56', has lost motion as illustrated by dotted lines. Lever 60' is constructed in a manner so as to obtain a flexible deformation after it has come into contact with lever 56' and overcome free travel. Through this deformation, lever 60' accepts the function of a flexible coupling so that a special coupling means is not required.

The present invention is not limited to the embodiments shown in the drawings. For example, even though the disclosure describes only one servo motor, it is, of course, possible to utilize two or more such servo motors, if corresponding operational areas are able to communicate. It is also possible to use two counter-distinct, single-functioning servo motors in place of one dual-functioning servo motor. The servo motors may thereby be constructed in such a manner that they are able to perform either translatory or rotary movements. Also, as mentioned above, the flexible coupling means may comprise pressure centered piston-cylinder systems, which are preferably supplied with a constant pressure.

It is claimed:

1. A fluid pressure control device for controlling a servo-motor, comprising in combination; a servo-motor having at least one working chamber, a power input member, a power output member, said power input member and power output members having relative movement,
   a pressure fluid source,
   at least one control valve of the closed-center type with blocked ports in a neutral position including means operable through relative movement between said power input and said power output member, flexible coupling means operatively connecting said power input member to said power output member,
   said servo-motor being operatively connected to said power output member, said control valve including at least one reaction area including means for reflecting developing fluid pressure to said power input member; and lost motion coupling means operatively connected between said control valve and said power input member for permitting said control valve to move relative to the output number without relative movement between said power input member and power output member.

2. The fluid pressure control device as claimed in claim 1 in which said lost motion coupling means includes a second flexible coupling means.

3. The fluid pressure control device as claimed in claim 15 in which said lost motion coupling means includes means causing said power input member to react on said second flexible coupling means prior to reaction on said first mentioned flexible coupling means between said power input and power output members.

4. The fluid pressure control device as claimed in claim 2 comprising a casing having an elongated valve member journaled therein for relative rotation about its longitudinal axis and comprising the power output member, said power input member journaled axially of said valve member, a pair of pistons reciprocatingly mounted in said valve member transversely of the axis of rotation of said valve member, a first force-transmitting lever spaced transversely of the valve member having opposite ends operatively connected to one end of a respective one of said pistons, a second lever overlying said first lever, said second flexible coupling means being interposed between adjacent opposite ends of said levers, said levers being rotatable as a unit after overcoming said second flexible coupling means, said power input and power output members being operatively connected to said levers.

5. The fluid pressure control device as claimed in claim 4 comprising a fulcrum element in said valve member upon which said first lever is intermediately pivoted.

6. The fluid pressure control device as claimed in claim 4 including force-transmitting elements projecting between said pistons and said first lever and extending through said second lever.

7. The fluid pressure control device as claimed in claim 4 in which said second flexible coupling means comprises spring elements interposed between confronting surfaces of the levers at opposite ends thereof.

8. The fluid pressure control device as claimed in claim 7 in which said levers include opposed recess portions in the confronting surfaces, said spring elements comprising helical springs seated at respective opposite ends in a confronting pair of opposed recess portions.

9. The fluid pressure control device as claimed in claim 4 in which said second flexible coupling means comprises a leaf spring comprising one of said levers.

10. The fluid pressure control device as claimed in claim 4 in which said first-mentioned flexible coupling means comprises an annular resilient collar operatively connected to said valve member and having a transverse slot provided opposed confronting ends, said power input member having an integral, radial lever projecting between the opposed confronting ends of said resilient collar.

* * * * *